(12) United States Patent
Li et al.

(10) Patent No.: US 7,761,287 B2
(45) Date of Patent: Jul. 20, 2010

(54) INFERRING OPINIONS BASED ON LEARNED PROBABILITIES

(75) Inventors: Hua Li, Beijing (CN); Jian-Lai Zhou, Beijing (CN); Dongmei Zhang, legal representative, Beijing (CN); Zheng Chen, Beijing (CN); Jian Wang, Beijing (CN)

(73) Assignee: Microsoft Corporation, Redwood, WA (US)

( * ) Notice: Subject to any disclaimer, the term of this patent is extended or adjusted under 35 U.S.C. 154(b) by 940 days.

(21) Appl. No.: 11/552,057

(22) Filed: Oct. 23, 2006

(65) Prior Publication Data

US 2008/0097758 A1 Apr. 24, 2008

(51) Int. Cl.
*G06F 17/20* (2006.01)
*G06Q 30/00* (2006.01)
(52) U.S. Cl. .................. 704/1; 705/14.19; 705/347; 706/55
(58) Field of Classification Search .......... 704/1, 704/9, 10, 240; 706/55; 705/10, 306, 344, 705/347, 14.19
See application file for complete search history.

(56) References Cited

U.S. PATENT DOCUMENTS

| | | | |
|---|---|---|---|
| 6,250,930 B1 | 6/2001 | Mintz | |
| 6,963,848 B1 * | 11/2005 | Brinkerhoff | 705/10 |
| 6,985,881 B2 | 1/2006 | Johnson et al. | |
| 7,363,214 B2 * | 4/2008 | Musgrove et al. | 704/9 |
| 7,430,552 B2 * | 9/2008 | Cameron et al. | 707/7 |
| 7,509,230 B2 * | 3/2009 | Fernandez et al. | 702/179 |
| 7,523,085 B2 * | 4/2009 | Nigam et al. | 706/55 |
| 7,624,102 B2 * | 11/2009 | Watson | 707/4 |
| 2003/0120649 A1 | 6/2003 | Uchino et al. | |
| 2004/0078214 A1 * | 4/2004 | Speiser et al. | 705/1 |

(Continued)

FOREIGN PATENT DOCUMENTS

WO    WO-01/53922    7/2001

(Continued)

OTHER PUBLICATIONS

Hu, Minqing et al., "Mining Opinion Features in Customer Reviews," Proceedings of Nineteenth National Conference on Artificial Intelligence (AAAI-2004), San Jose, USA, Jul. 2004 (6 pages).

(Continued)

*Primary Examiner*—Martin Lerner
(74) *Attorney, Agent, or Firm*—Perkins Coie LLP

(57) ABSTRACT

An opinion system infers the opinion of a sentence of a product review based on a probability that the sentence contains certain sequences of parts of speech that are commonly used to express an opinion as indicated by the training data and the probabilities of the training data. When provided with the sentence, the opinion system identifies possible sequences of parts of speech of the sentence that are commonly used to express an opinion and the probability that the sequence is the correct sequence for the sentence. For each sequence, the opinion system then retrieves a probability derived from the training data that the sequence contains an opinion word that expresses an opinion. The opinion system then retrieves a probability from the training data that the opinion words of the sentence are used to express an opinion. The opinion system then combines the probabilities to generate an overall probability that the sentence with that sequence expresses an opinion.

20 Claims, 9 Drawing Sheets

U.S. PATENT DOCUMENTS

| | | | |
|---|---|---|---|
| 2004/0117237 | A1 | 6/2004 | Arora |
| 2004/0235460 | A1* | 11/2004 | Engstrom et al. ........ 455/414.1 |
| 2005/0060222 | A1 | 3/2005 | White |
| 2005/0091038 | A1* | 4/2005 | Yi et al. ........................ 704/10 |
| 2005/0114161 | A1 | 5/2005 | Garg et al. |
| 2005/0125216 | A1* | 6/2005 | Chitrapura et al. .............. 704/1 |
| 2005/0154556 | A1* | 7/2005 | Keller et al. ................. 702/181 |
| 2005/0197988 | A1* | 9/2005 | Bublitz ........................ 706/46 |
| 2006/0085248 | A1 | 4/2006 | Arnett et al. |
| 2006/0212897 | A1* | 9/2006 | Li et al. ......................... 725/32 |
| 2007/0043610 | A1* | 2/2007 | Wang ........................... 705/12 |
| 2007/0143122 | A1* | 6/2007 | Holloway et al. .............. 705/1 |
| 2007/0214000 | A1* | 9/2007 | Shahrabi et al. ................ 705/1 |
| 2008/0249762 | A1* | 10/2008 | Wang et al. .................... 704/9 |
| 2008/0313180 | A1* | 12/2008 | Zeng et al. ..................... 707/6 |
| 2009/0299855 | A1* | 12/2009 | Li et al. ................... 705/14.54 |
| 2010/0023311 | A1* | 1/2010 | Subrahmanian et al. ........ 704/2 |

FOREIGN PATENT DOCUMENTS

| | | | |
|---|---|---|---|
| WO | WO 03/007200 | * | 1/2003 |

OTHER PUBLICATIONS

Dave, Kushal et al., "Mining the Peanut Gallery: Opinion Extraction and Semantic Classification of Product Reviews," WWW2003, May 20-24, 2003, Budapest, Hungary, ACM (10 pages).

Whitelaw, Casey et al., "Using Appraisal Groups for Sentiment Analysis," CIKM '05, Oct. 31-Nov. 5, 2005, Bremen, Germany, copyright 2005 ACM (7 pages).

Agrawal, Rakesh et al., "Mining Sequential Patterns," In Proc. of the Int'l Conf. on Data Engineering (ICDE), 1995 (12 pages).

Agrawal, Rakesh et al., "Fast Algorithms for Mining Association Rules," Proc. 20th Int. Conf. Very Large Data Bases, VLDB, 1994 (32 pages).

* cited by examiner

INFERRING OPINIONS BASED ON LEARNED PROBABILITIES

BACKGROUND

Electronic commerce via the World Wide Web ("web") is becoming an increasingly popular way for people to buy products. The people who use the web to buy products often turn to the web for help in deciding what products to buy and from which web retailer. Many sources of product reviews are available via the web to help a person. These product reviews may be provided by professional product review web sites (e.g., CNet), commercial web sites (e.g., Amazon.com), discussion boards, and personal web sites and web logs ("blogs"). A person can use any of these sources of product reviews to help in their buying decision.

Product reviews may be generated by experts or by customers of retail web sites. A professional product review web site may enlist the services of various experts to review products or services that may include movies, music, books, automobiles, electronic products, software, and so on. These experts review the products and provide their opinion on the product via a product review. Many of these professional product review web sites generate significant revenue from advertisements that are presented along with their reviews. To increase traffic to their web sites, these professional product review web sites typically try to ensure the quality of their reviews. In contrast, some retail web sites allow any customer to submit a product review, but may exert no control over the quality and accuracy of the product reviews.

In addition to helping potential buyers make buying decisions, these product reviews may provide valuable feedback to manufacturers who seek to improve the quality of their products. The product reviews provide a wealth of information relating to what experts and customers like and dislike about a manufacturer's products. Because of the large volume of product reviews being created, it can be very difficult and time-consuming for a manufacturer to identify all the product reviews for the manufacturer's products and then to categorize the product reviews as expressing a positive or negative opinion about the product.

Although some attempts have been made to classify product reviews as being positive or negative, these attempts typically try to classify product reviews by applying text classification techniques. These attempts generate training data by classifying product reviews as being positive or negative. The attempts then extract features and train a classifier to classify product reviews based on the features of the reviews. Text classification techniques, however, may not be particularly effective at classifying product reviews. Text classification techniques rely, in large part, on term frequency to identify the topics of a document. Since the opinion of a product review may be expressed clearly only in a single sentence of a long product review, the use of term frequency may not help identify the opinion. Also, some product reviews may have their opinions expressed indirectly or may even attempt to mask their opinion. In such cases, text classification techniques will likely not be able to correctly classify the opinions expressed by the product reviews.

SUMMARY

A method and system for determining an opinion expressed via target words is provided. An opinion system determines the opinion expressed by a sentence based on opinion data representing statistical properties of product reviews that express an opinion. The opinion system learns the statistical properties from training data. The training data includes sentences and the opinion (e.g., positive or negative) expressed by each sentence. The opinion system generates the statistics by first identifying sequences of parts of speech or sequential patterns of the training data that are commonly used to express an opinion. The opinion system then calculates from the training data the probabilities that each identified sequence of the parts of speech may contain a certain opinion word. An opinion word is a word that is often used to express an opinion. To complete the generating of the statistics, the opinion system calculates the probabilities from the training data that various opinion words are used to express an opinion.

After the opinion system learns the opinion data, the opinion system can then infer opinions of product reviews using the opinion data. The opinion system infers the opinion of a sentence of a product review based on a probability that the sentence contains certain sequences of parts of speech that are commonly used to express an opinion as indicated by the training data and the probabilities of the training data. When provided with the sentence, the opinion system identifies possible sequences of parts of speech of the sentence. The opinion system may apply natural language processing techniques to identify the sequences along with a probability that each sequence is the correct sequence for the sentence. For each sequence, the opinion system then retrieves from the opinion data the probability that the sequence contains an opinion word. The opinion system then retrieves from the opinion data the probability that the opinion words of the sentence are used to express an opinion. The opinion system then combines the probabilities to generate an overall probability that the sentence with that sequence expresses an opinion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
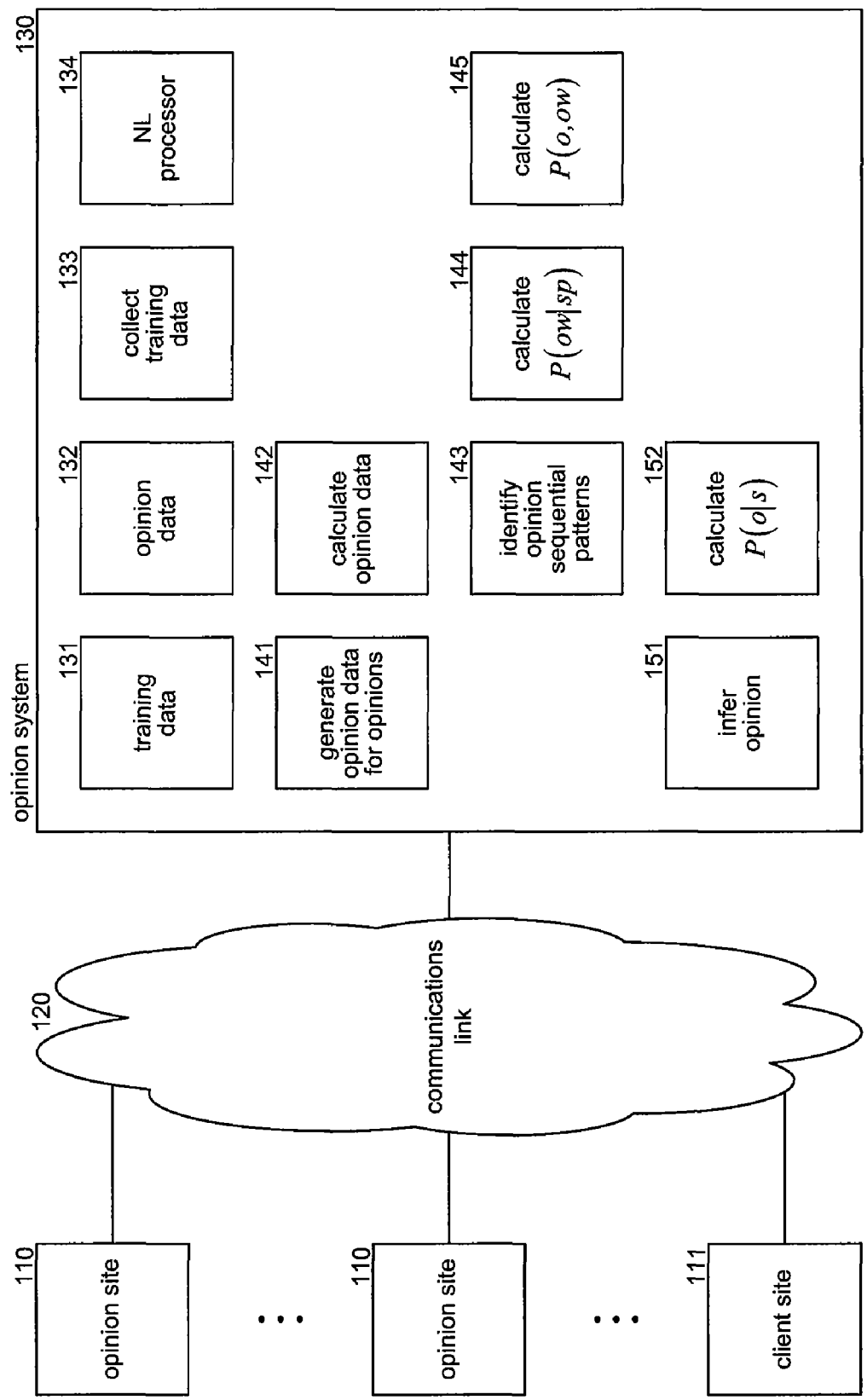
FIG. 1 is a block diagram that illustrates components of the opinion system in one embodiment.

A method and system for determining an opinion expressed via target words is provided. In one embodiment, an opinion system determines the opinion expressed by a sentence (i.e., target words) based on opinion data representing statistical properties of product reviews that express an opinion. The opinion system learns the statistical properties from training data. The training data includes sentences and the opinion (e.g., positive or negative) expressed by each sentence. The opinion system generates the statistics by first identifying sequences of parts of speech or sequential patterns of the training data that are commonly used to express an opinion. For example, sentences that express a positive opinion may commonly include a sequence of a noun and a verb followed by an adjective. The opinion system then calculates from the training data the probabilities that each identified sequence of the parts of speech may contain a certain opinion word. An opinion word is a word that is often used to express an opinion. For example, "love," "hate," and "best" are opinion words. These opinion words may likely be used to express an opinion when used with certain sequences of parts of speech. To complete the generating of the statistics, the opinion system calculates the probabilities from the training data that various opinion words are used to express an opinion. For example, the opinion word "best" may or may not be used in product reviews to express an opinion. The sentence "We hired the best experts to evaluate the car" does not express an opinion about the car, whereas the sentence "It is one of the best cars of the year" does express an opinion about the car. In contrast, the opinion word "love" is typically used to express a positive opinion. The opinion system may generate one set of opinion data from sentences that express positive opinions and another set of opinion data from sentences that express negative opinions. After the opinion system learns the opinion data, the opinion system can then infer opinions of product reviews using the opinion data.

In one embodiment, the opinion system infers the opinion of a sentence of a product review based on a probability that the sentence contains certain sequences of parts of speech that are commonly used to express an opinion as indicated by the training data and the probabilities of the training data. When provided with the sentence, the opinion system identifies possible sequences of parts of speech of the sentence. The opinion system may apply natural language processing techniques to identify the sequences along with a probability that each sequence is the correct sequence for the sentence. For each sequence, the opinion system then retrieves from the opinion data the probability that the sequence contains an opinion word. The opinion system then retrieves from the opinion data the probability that the opinion words of the sentence are used to express an opinion. The opinion system then combines the probabilities to generate an overall probability that the sentence with that sequence expresses an opinion. The opinion system may generate, for each sequence of parts of speech, an overall probability that the sentence expresses a positive opinion using the positive opinion data and an overall probability that the sentence expresses a negative opinion using the negative opinion data. The opinion system then selects the opinion associated with the higher probability as the opinion of the sentence. The opinion system may derive the overall opinion of the product review from the opinions of its sentences.

In one embodiment, the opinion system represents the probability that a sentence expresses a positive or negative opinion by the following:

$$P(o|s)=P(o|ow)*P(ow|sp)*P(sp|s)$$

where $P(x|y)$ represents the conditional probability of x given y, s represents the sentence, o represents the opinion, ow represents an opinion word that may express an opinion, and sp represents a sequence of parts of speech that may express an opinion. The opinion system identifies the sequences of parts of speech that may express an opinion from the training data. The opinion system may use a natural language processor such as the NLProcessor-Text Analysis Toolkit, 2000 (at URL generated by appending "www," ".infogistics," ".com," "/textanalysis," and ".html"). The opinion system uses the natural language processor to segment product reviews into sentences and to tag each sentence with its parts of speech. Although the natural language processor may use low-level parts of speech tags, the opinion system may group the low-level tags into high-level tags to help overcome problems with sparseness of the data for certain low-level tags. The opinion system then applies a Generalized Sequential Pattern ("GSP") algorithm to the sequences to identify sequential patterns of parts of speech in the training data. One GSP algorithm is described in Srikant, R., and Agrawal, R., "Mining Sequential Patterns Generalizations and Performance Improvements," IBM Research Report RJ 9994, 1995. The opinion system may define sequences that may express an opinion as those sequences that occur in more than a certain percentage (e.g., 0.5%) of the sentences. The opinion system may also prune the sequences of length one.

The opinion system calculates from the training data the conditional probability that a sequential pattern contains an opinion word. Opinion words are words that tend to show strong opinions. They are typically adverbs and adjectives, but can be verbs (i.e., love) or nouns (e.g., pain). The phrase "generally turned out pretty awful" has the part-of-speech pattern of <(adverb, verb), (adverb, adjective)>, which may be indicative of a sequence that is likely to contain opinion words. The opinion system may calculate the conditional probability as follows:

$$P(ow|sp) = \frac{C_{ow|sp}}{C_{sp}}$$

where $P(ow|sp)$ represents the conditional probability of a sentence containing an opinion word ow given a sequence of parts of speech sp of the sentence, $C_{ow|sp}$ represents the count of sentences that match the sequence sp and that contain an opinion word ow, and $C_{sp}$ is the count of sentences that match the sequence sp. The opinion system may also use a thesaurus to help augment the opinion words.

The opinion system calculates from the training data the conditional probability that an opinion word expresses a certain opinion. The opinion system starts out with an initial set of high-frequency opinion words from the training data. The opinion system then identifies synonyms and antonyms which are added to the set of opinion words. The opinion system repeats the process until no new synonyms or antonyms are defined. The opinion system calculates the conditional probability as follows:

$$P(o \mid ow) = \frac{C_{o\mid ow}}{C_{ow}}$$

where P(o|ow) represents the conditional probability of a sentence expressing opinion o given that the sentence contains an opinion word ow, $C_{o|ow}$ represents the count of sentences that contain the opinion word ow that express the opinion o, and $C_{ow}$ is a count of sentences that contain the opinion word ow.

FIG. 1 is a block diagram that illustrates components of the opinion system in one embodiment. The opinion system 130 is connected to opinion sites 110 and client sites 111 via communications link 120. The opinion sites may contain product reviews or other opinions generated by experts or non-experts. The client site may use services of the opinion system to determine the opinion of product reviews. The opinion system includes a training data store 131, an opinion data store 132, a collect training data component 133, and a natural language processor component 134. The training data store contains sentences that express an opinion along with the expressed opinion (e.g., positive or negative). The collect training data component scans the opinion sites and collects product reviews and then inputs the opinions. The collect training data component may present sentences to a trainer and ask the trainer to indicate whether the sentence expresses a positive, a negative, or no opinion. If a sentence expresses no opinion, the opinion system may discard it. The opinion system also includes a generate opinion data for opinions component 141, a calculate opinion data component 142, an identify opinion sequential patterns component 143, a calculate probability of an opinion word given a sequential pattern component 144, and a calculate probability of an opinion given an opinion word component 145. The generate opinion data for opinions component identifies the opinion sequential patterns. The component then stores the opinion data in the opinion data store. The component invokes the calculate opinion data component to generate the positive opinion data for the sentences that express positive opinions and negative opinion data for the sentences that express negative opinions. The identify opinion sequential patterns component invokes the natural language processor component and uses a generalized sequential patterns algorithm to identify sequential patterns that likely express an opinion. The calculate probability of an opinion word given a sequential pattern component and the calculate probability of an opinion given an opinion word component calculate the probabilities associated with the opinion data. The opinion system also includes an infer opinion component 151 and a calculate probability of opinion given a sentence component 152. The infer opinion component receives a product review and invokes the calculate probability of opinion given a sentence component and identifies the opinion of the product review.

The computing device on which the opinion system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the opinion system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the opinion system may be implemented in various operating environments that include personal computers, server computers, hand-held or laptop devices, multiprocessor systems, microprocessor-based systems, programmable consumer electronics, digital cameras, network PCs, minicomputers, mainframe computers, cell phones, personal digital assistants, smart phones, personal computers, programmable consumer electronics, distributed computing environments that include any of the above systems or devices, and so on.

The opinion system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
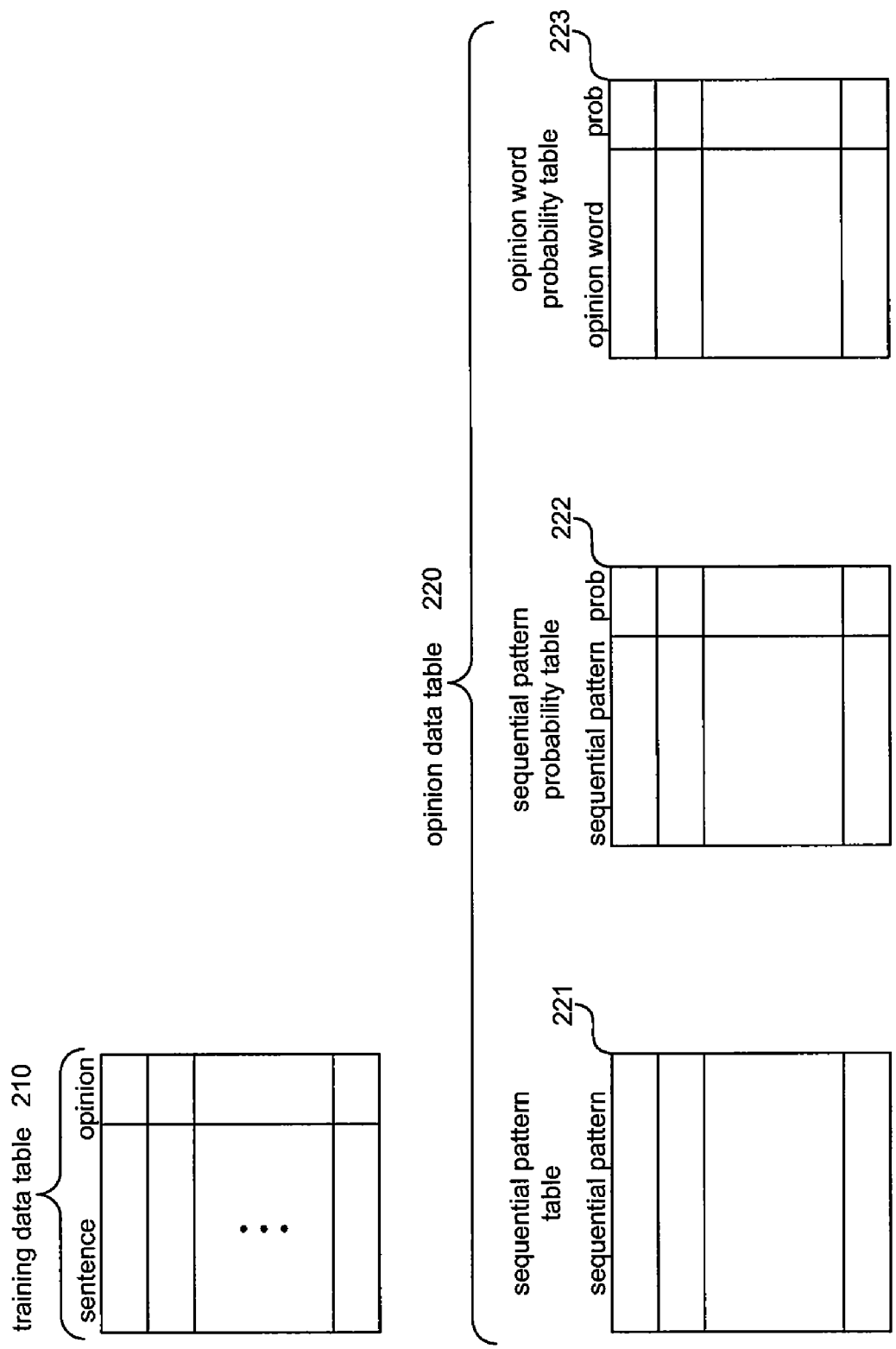
FIG. 2 is a block diagram that illustrates data of the opinion system in one embodiment.

FIG. 2 is a block diagram that illustrates data of the opinion system in one embodiment. The training data is represented by a training data table 210 that contains an entry for each sentence of the training data. Each entry identifies the sentence along with the opinion that the sentence expresses. Depending on how the opinion system is to be used, the possible opinions may be a single opinion, two opinions, or more than two opinions. For example, the opinion system may be used to identify product reviews that express a positive opinion. In such a case, the training data might only include sentences that express a positive opinion. Alternatively, the opinion system may be used to identify product reviews that express a range of opinions such as very positive, positive, negative, and very negative. In such a case, each sentence of the training data would have associated with it one of the opinions in the range. The opinion data is represented by the opinion data tables 220. The opinion data tables include a sequential pattern table 221, a sequential pattern probability table 222, and an opinion word probability table 223. The sequential pattern table contains an entry for each sequential pattern of the parts of speech of sentences that is likely to express an opinion. The sequential pattern probability table also contains an entry for each sequential pattern along with a probability that that sequential pattern contains an opinion word. The opinion word probability table contains an entry for each opinion word along with the probability that that opinion word expresses an opinion. The opinion system may maintain a set of opinion tables for each possible opinion. For example, the opinion data may include opinion data tables for positive opinions and opinion data tables for negative opinions.

Figure 3:
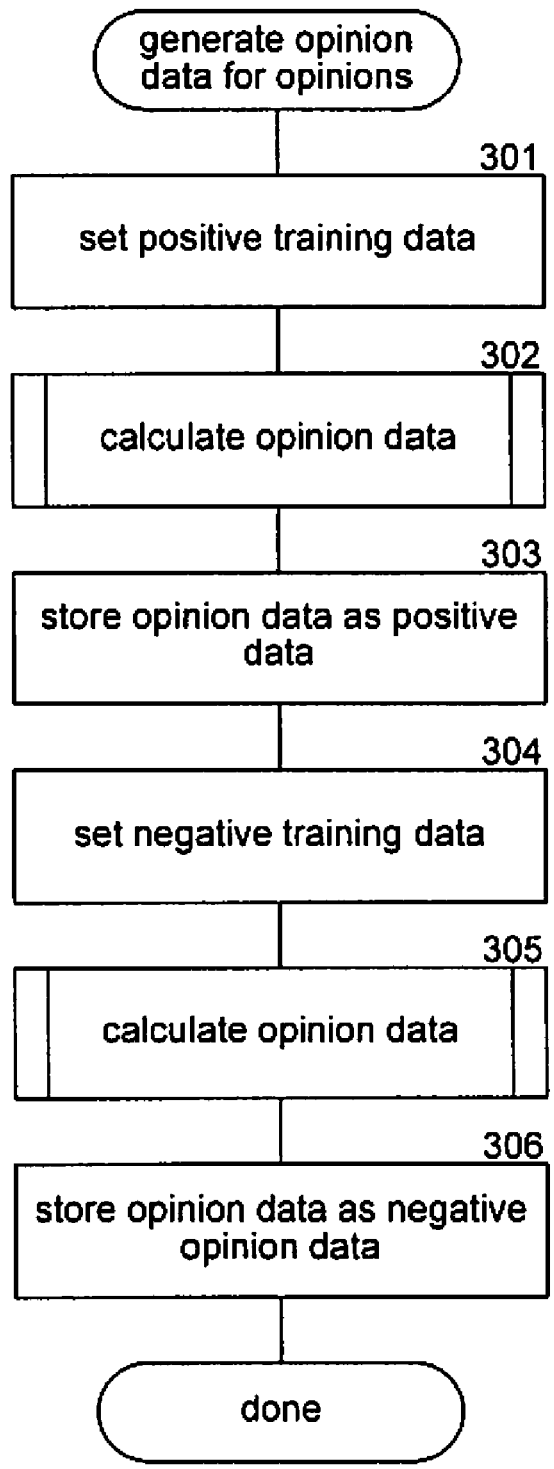
FIG. 3 is a flow diagram that illustrates the processing of the generate opinion data for opinions component of the opinion system in one embodiment.

FIG. 3 is a flow diagram that illustrates the processing of the generate opinion data for opinions component of the opinion system in one embodiment. The component inputs the training data and outputs the opinion data for the possible opinions. In block 301, the component sets the training data to the positive training data. In block 302, the component invokes the calculate opinion data component to calculate the opinion data for the positive training data. In block 303, the component stores the calculated opinion data as positive opinion data. In block 304, the component sets the training data to the negative training data. In block 305, the component invokes the calculate opinion data component to calculate the opinion data for the negative training data. In block 306, the component stores the calculated opinion data as negative opinion data and then completes.

Figure 4:
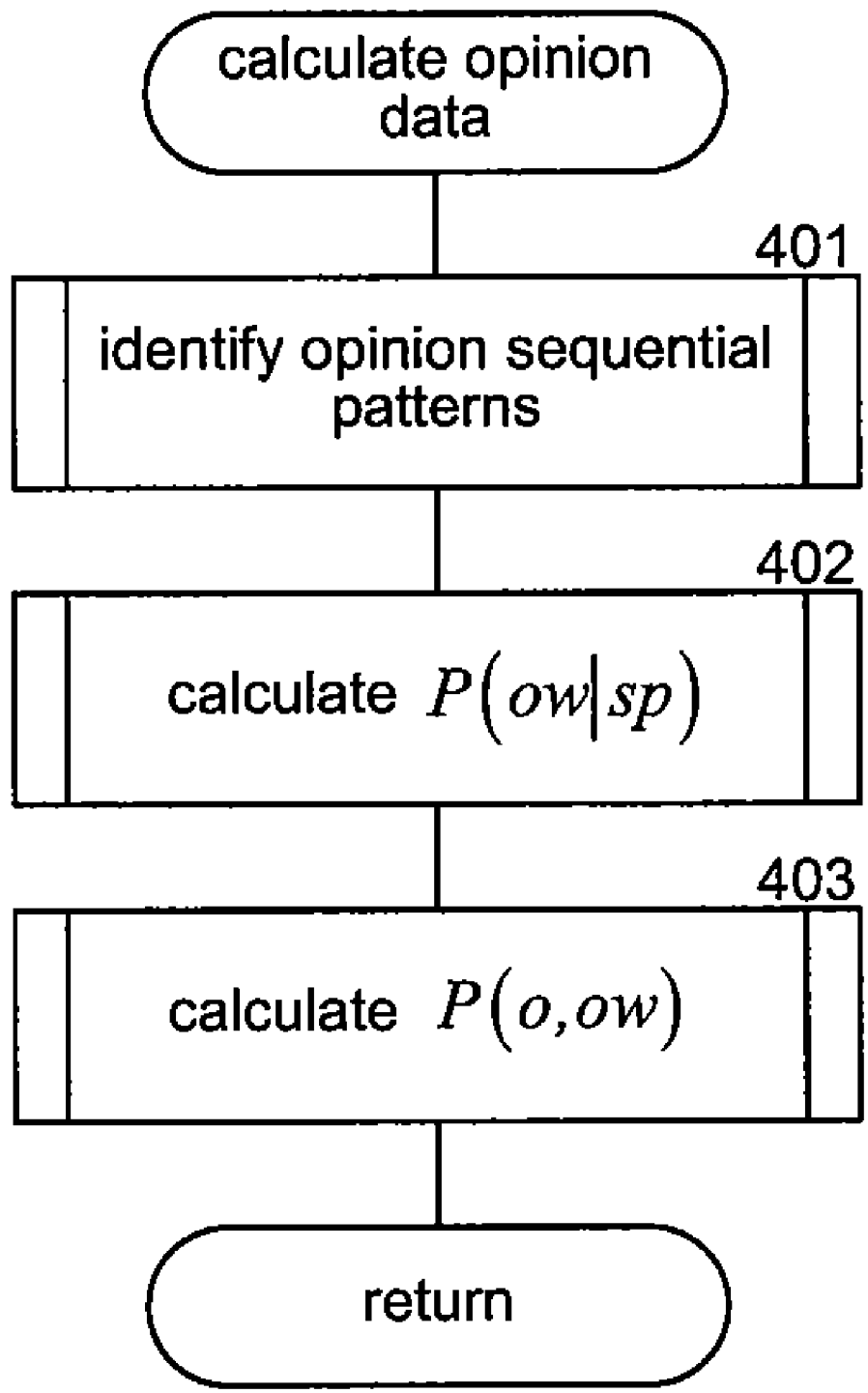
FIG. 4 is a flow diagram that illustrates the processing of the calculate opinion data component of the opinion system in one embodiment.

FIG. 4 is a flow diagram that illustrates the processing of the calculate opinion data component of the opinion system in one embodiment. The component calculates opinion data from the current setting of the training data. In block 401, the component invokes the identify opinion sequential patterns component to identify sequential patterns of parts of speech in the training data that likely express opinions. In block 402, the component invokes the calculate probability for opinion word given a sequential pattern component. In block 403, the component invokes the calculate probability of an opinion given an opinion word component and then returns.

Figure 5:
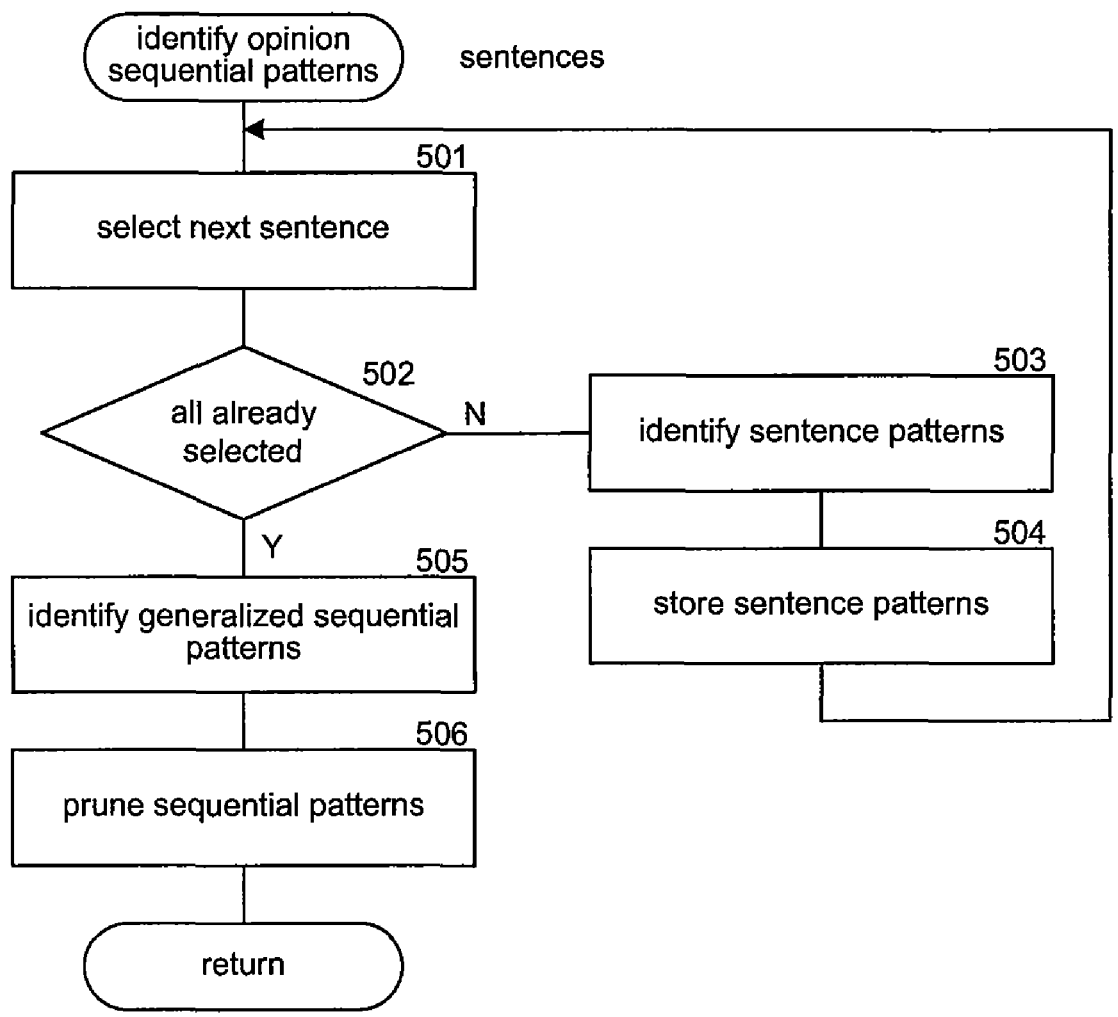
FIG. 5 is a flow diagram that illustrates the processing of the identify opinion sequential patterns component of the opinion system in one embodiment.

FIG. 5 is a flow diagram that illustrates the processing of the identify opinion sequential patterns component of the opinion system in one embodiment. The component is passed the sentences that express an opinion and identifies sequential patterns of parts of speech that are likely to express an opinion. In blocks 501-504, the component loops identifying the sentence patterns of parts of speech for each sentence. In block 501, the component selects the next sentence. In decision block 502, if all the sentences have already been selected, then the component continues at block 505, else the component continues at block 503. In block 503, the component identifies the sentence pattern of the parts of speech of the selected sentence by invoking the natural language processor. In block 504, the component stores the sentence patterns and then loops to block 501 to select the next sentence. In block 505, the component identifies the sequential patterns from the stored sentence patterns using a generalized sequential patterns algorithm as described above. In block 506, the component prunes the sequential patterns and then returns.

Figure 6:
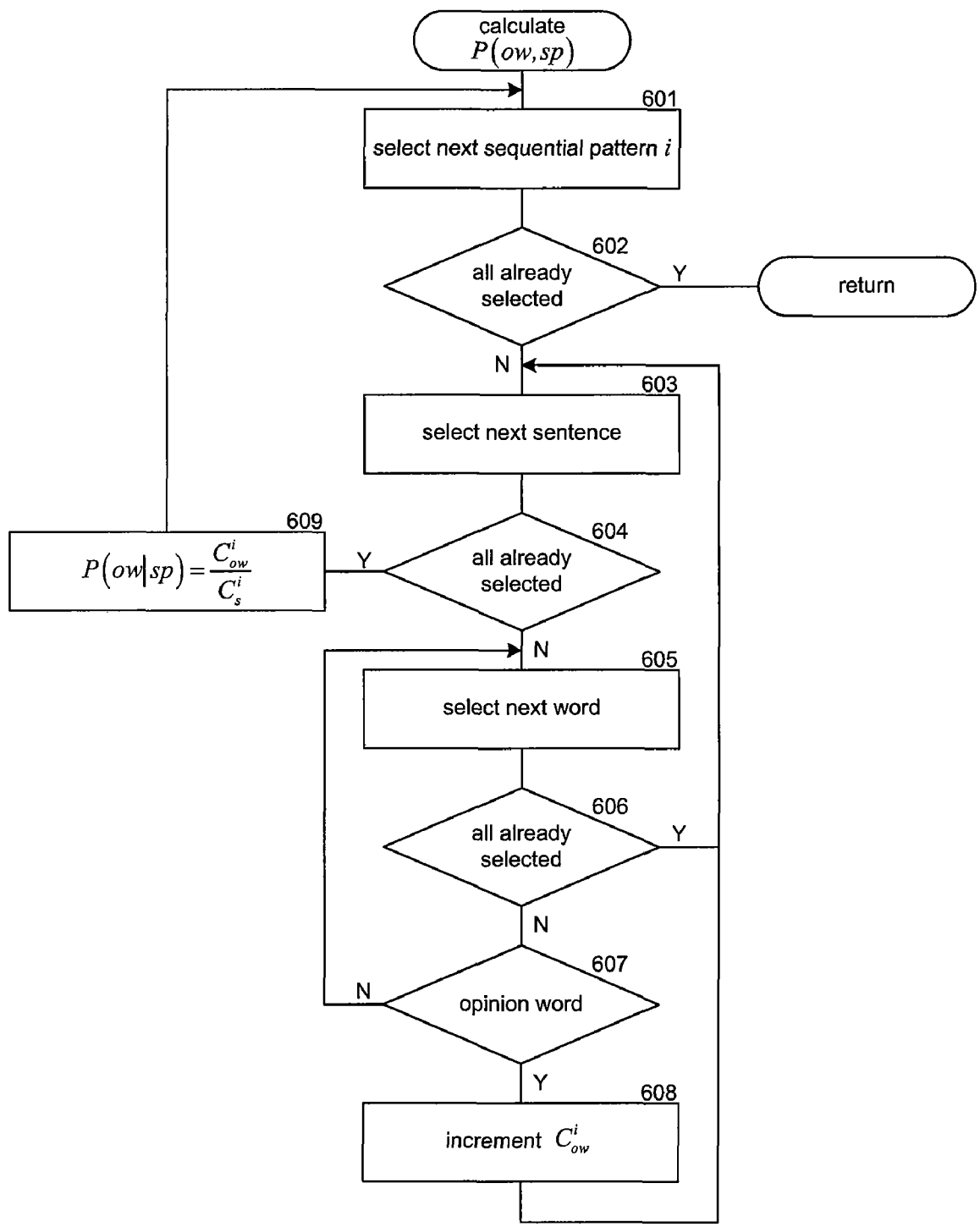
FIG. 6 is a flow diagram that illustrates the processing of the calculate probability of an opinion word given a sequential pattern component of the opinion system in one embodiment.

FIG. 6 is a flow diagram that illustrates the processing of the calculate probability of an opinion word given a sequential pattern component of the opinion system in one embodiment. The component loops calculating a probability for each sequential pattern. In block 601, the component selects the next sequential pattern. In decision block 602, if all the sequential patterns have already been selected, then the component returns, else the component continues at block 603. In blocks 603-608, the component loops selecting each sentence that matches the selected sequential pattern and determines whether it contains an opinion word. In block 603, the component selects the next sentence that matches the selected sequential pattern. In decision block 604, if all the sentences have already been selected, then the component continues at block 609, else the component continues at block 605. In block 605, the component selects the next word of the selected sentence. In decision block 606, if all the words of the selected sentence have already been selected, then the component loops to block 603 to select the next sentence, else the component continues at block 607. In decision block 607, if the selected word is an opinion word, then the component continues at block 608, else the component loops to block 605 to select the next word. In block 608, the component increments the count of sentences with the selected sequential pattern that contain an opinion word and then loops to block 603 to select the next sentence. In block 609, the component calculates the probability of an opinion word given the selected sequential pattern as the count of sentences that contain the opinion word divided by the count of sentences that match the selected sequential pattern. The component then loops to block 601 to select the next sequential pattern.

Figure 7:
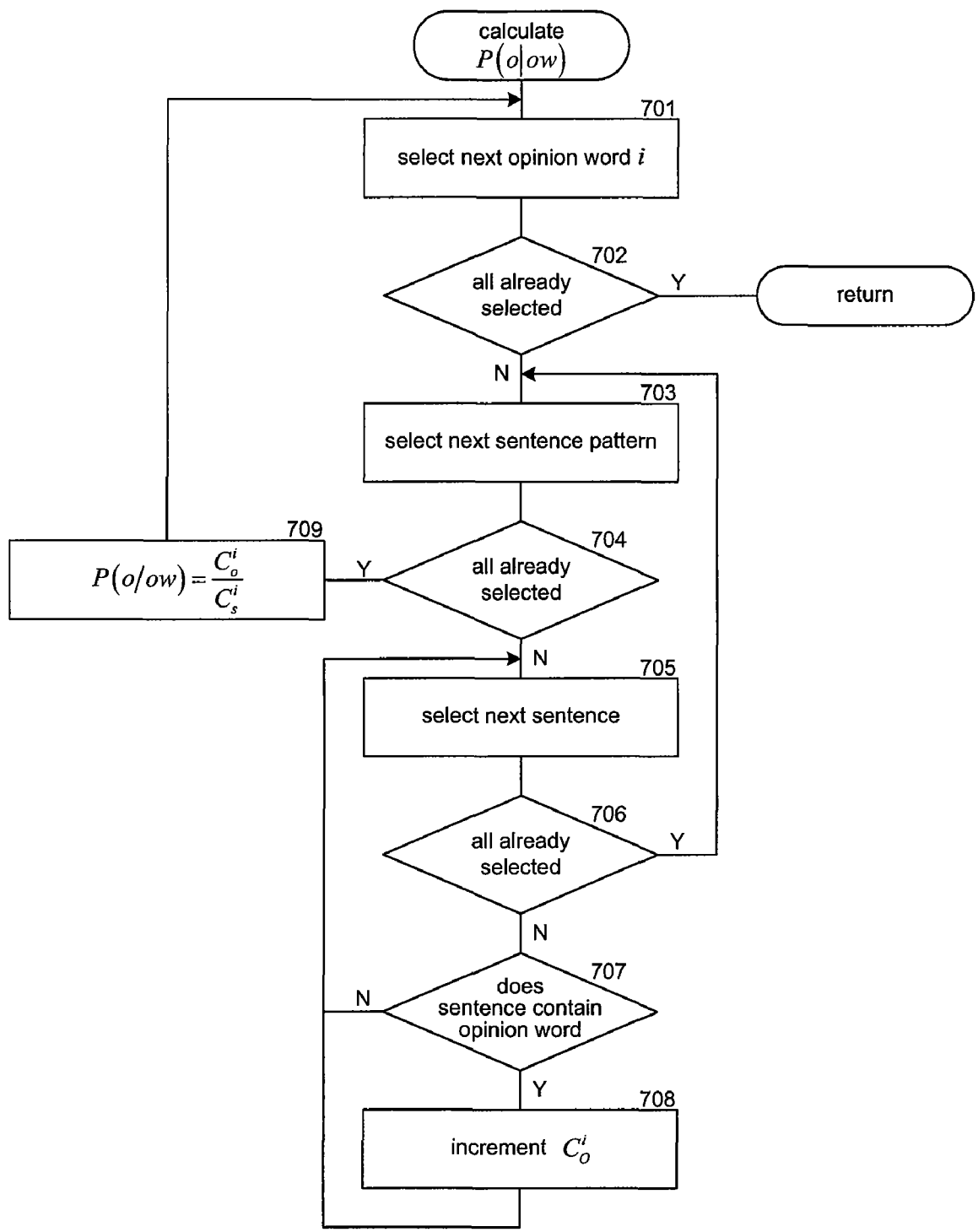
FIG. 7 is a flow diagram that illustrates the processing of the calculate probability of an opinion given an opinion word component of the opinion system in one embodiment.

FIG. 7 is a flow diagram that illustrates the processing of the calculate probability of an opinion given an opinion word component of the opinion system in one embodiment. The component loops calculating a probability for each opinion word. In block 701, the component selects the next opinion word. In decision block 702, if all the opinion words have already been selected, then the component returns, else the component continues at block 703. In blocks 703-708, the component loops selecting each sequential pattern and determining whether sentences that match that sequential pattern contain the selected opinion word. In block 703, the component selects the next sequential pattern. In decision block 704, if all the sequential patterns have already been selected, then the component continues at block 709, else the component continues at block 705. In block 705, the component selects the next sentence that matches the selected sequential pattern. In decision block 706, if all the sentences have already been selected, then the component loops to block 703 to select the next sequential pattern, else the component continues at block 707. In decision block 707, if the selected sentence contains an opinion word, then the component continues at block 708, else the component loops to block 705 to select the next sentence. In block 708, the component increments the count of the sentences that contain the selected opinion word and then loops to block 705 to select the next sentence. In block 709, the component sets the probability of an opinion given an opinion word to the count of sentences that contain the opinion word divided by the count of sentences. The component then loops to block 701 to select the next opinion word.

Figure 8:
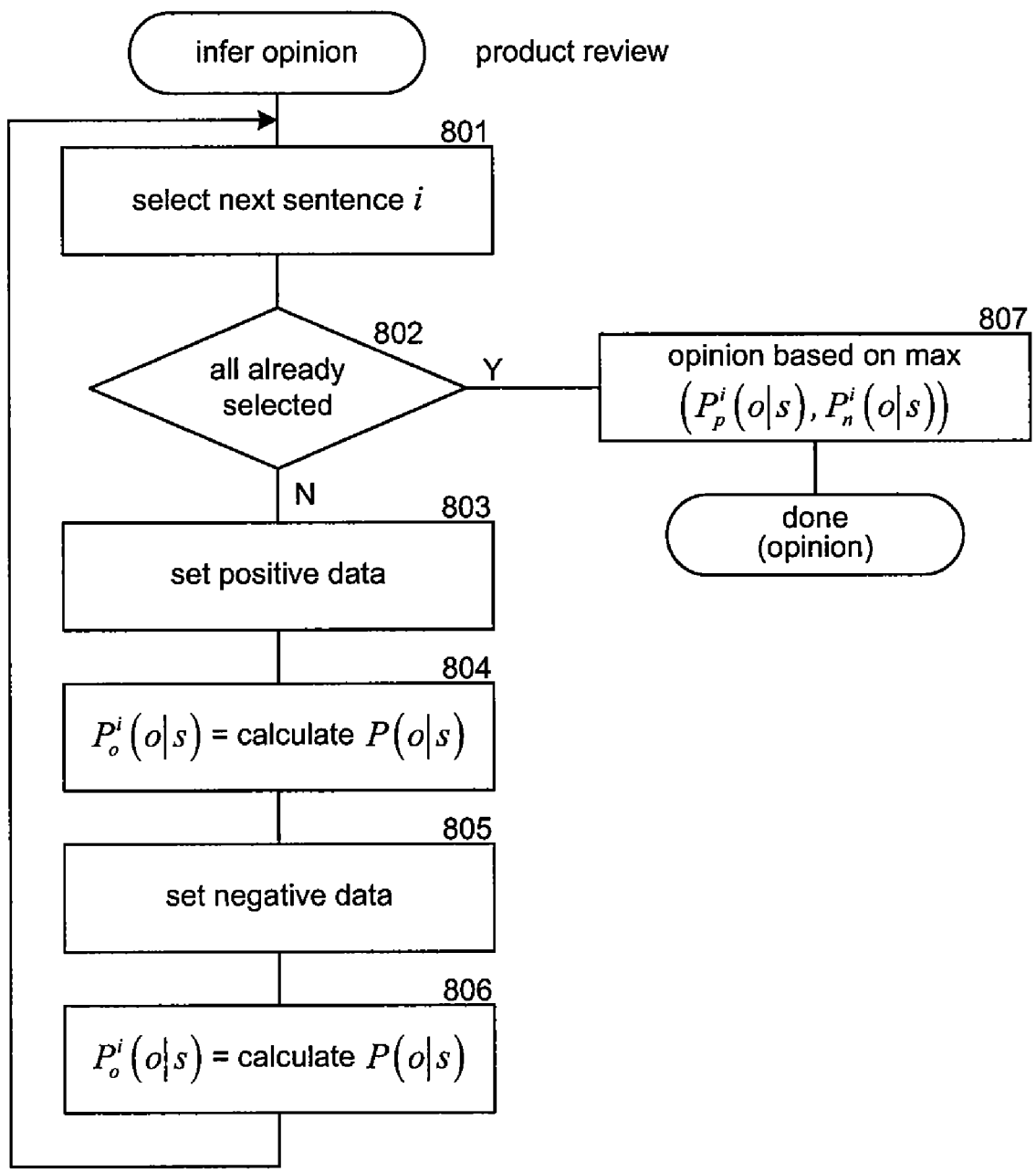
FIG. 8 is a flow diagram that illustrates the processing of the infer opinion component of the opinion system in one embodiment.

FIG. 8 is a flow diagram that illustrates the processing of the infer opinion component of the opinion system in one embodiment. The component is passed a product review and indicates whether it expresses a positive or a negative opinion. In block 801, the component selects the next sentence of the product review. In decision block 802, if all the sentences have already been selected, then the component continues at block 807, else the component continues at block 803. In block 803, the component sets the opinion data to point to the positive opinion data. In block 804, the component invokes the calculate probability of opinion given a sentence component to calculate the probability that the selected sentence expresses a positive opinion. In block 805, the component sets the opinion data to point to the negative opinion data. In block 806, the component invokes the calculate probability of opinion given a sentence component to calculate the probability that the selected sentence expresses a negative opinion. The component then loops to block 801 to select the next sentence. In block 807, the component selects an opinion for the product review based on the maximum of the probabilities of the positive and negative opinions. The component then completes.

Figure 9:
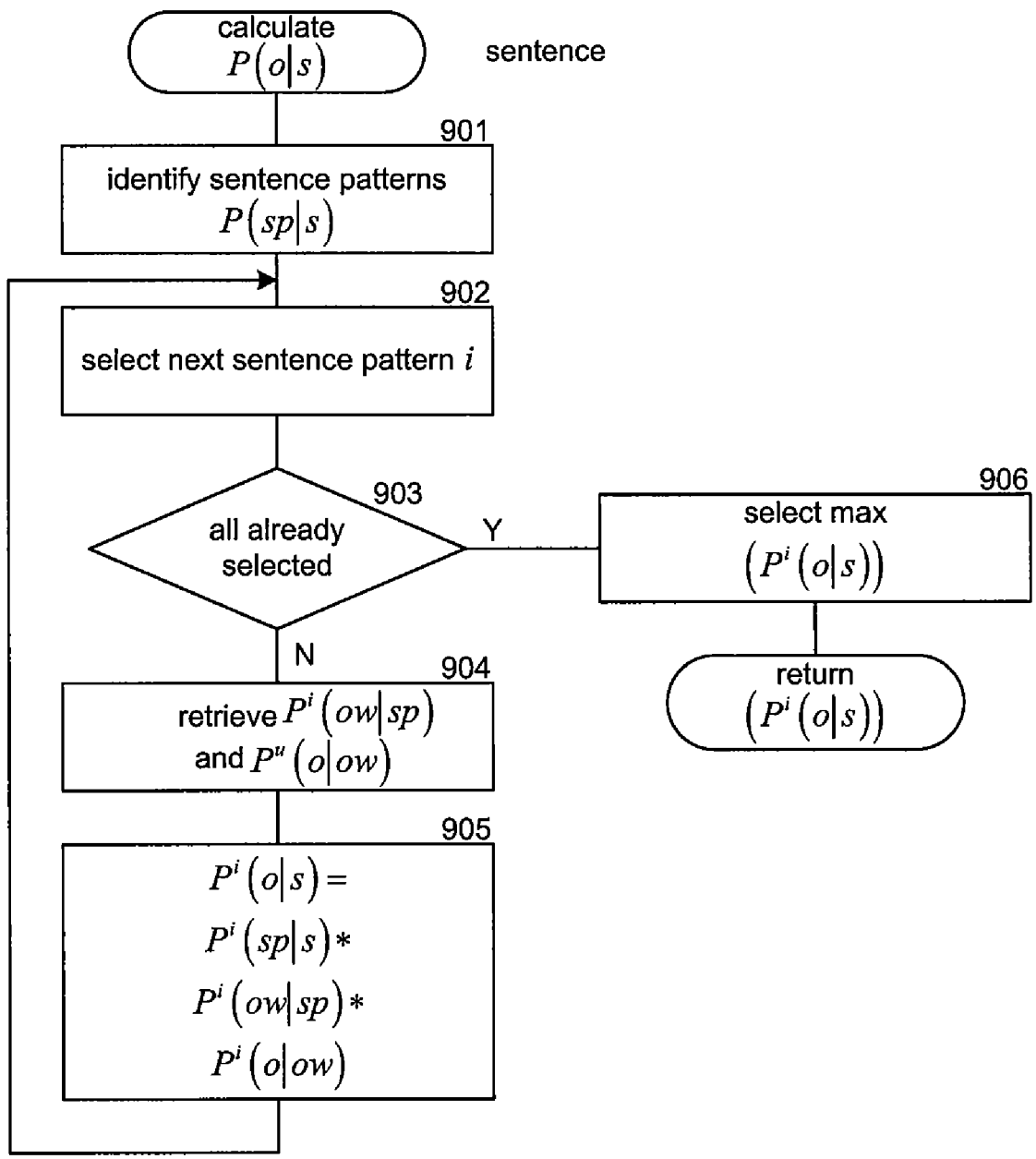
FIG. 9 is a flow diagram that illustrates the processing of the calculate probability of opinion given a sentence component of the opinion system in one embodiment.

FIG. 9 is a flow diagram that illustrates the processing of the calculate probability of opinion given a sentence component of the opinion system in one embodiment. The component is passed a sentence and returns a probability that the sentence expresses the opinion of the opinion data. In block 901, the component identifies the sentence patterns of the sentence using a natural language processor. The natural language processor provides a probability that a sequence is the correct sequence for the sentence. In block 902, the component selects the next sentence pattern. In decision block 903, if all the sentence patterns have already been selected, then the component continues at block 906, else the component continues at block 904. In block 904, the component retrieves from the opinion data the probability that the sentence contains an opinion word given the sequence and the probability that the sentence expresses the opinion given the opinion words of the sentence. If a sentence includes multiple opinion words, the component may combine the probabilities to generate a normalized probability for the opinion words. In block 905, the component combines the probabilities to generate a probability of the opinion given the sentence for the selected sentence pattern. The component then loops to block 902 to select the next sentence pattern. In block 906, the component selects the maximum probability calculated in block 905 and returns that probability as the probability of the opinion given the sentence.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computing device for determining an opinion expressed via target words, the device comprising
    an opinion data store that specifies sequences of parts of speech that may express an opinion, a probability that each sequence contains a word that may express an opinion, and a probability that each word expresses an opinion; and
    an infer opinion component that includes
        a component that calculates a probability that the target words contain sequences specified in the opinion data store;
        a component that retrieves from the opinion data store the probability that the sequences of the target words contain a word that may express an opinion;
        a component that retrieves from the opinion data store the probability that the words of the target words may express an opinion; and
        a component that selects an opinion for the target words based on a combination of the probabilities.

2. The computing device of claim 1 wherein the target words are from a product review.

3. The computing device of claim 1 wherein the sequences and probabilities of the opinion data store are associated with a positive opinion or negative opinion.

4. The computing device of claim 3 wherein the infer opinion component calculates a combined probability that the target words express a positive opinion and a combined probability that the target words express a negative opinion and selects as the opinion for the target words the opinion associated with the higher combined probability.

5. The computing device of claim 1 including:
    a generate opinion data component that generates opinion data of the opinion data store including:
        an identify sequences component that identifies sequences of parts of speech that may express an opinion;
        a first calculate probability component that calculates a probability that each sequence contains a word that may express an opinion; and
        a second calculate probability component that calculates a probability that each word expresses an opinion.

6. The computing device of claim 5 wherein the identify sequences component uses a natural language processor to identify parts of speech and a generalized sequential patterns algorithm to identify sequences of parts of speech.

7. The computing device of claim 1 wherein the combined probability is represented by the following:

$$P(o|s)=P(o|ow)*P(ow|sp)*P(sp|s)$$

where P(x|y) represents the conditional probability of x given y, s represents the target words, o represents the opinion, ow represents opinion words of the sentence that may express an opinion, and sp represents sequences of parts of speech that may express an opinion.

8. The computing device of claim 1 wherein the target words are from a product review, wherein the sequences and probabilities of the opinion data store are associated with a positive opinion or negative opinion, wherein the infer opinion component calculates a combined probability that the target words express a positive opinion and a combined probability that the target words express a negative opinion and selects as the opinion for the target words the opinion associated with the higher combined probability and including
    a generate opinion data component that generates opinion data of the opinion data store including:
        an identify sequences component that identifies sequences of parts of speech that may express a positive opinion or a negative opinion and that uses a natural language processor to identify parts of speech and a generalized sequential patterns algorithm to identify sequences of parts of speech;
        a first calculate probability component that calculates a probability that each sequence contains a word that may express a positive opinion or a negative opinion; and
        a second calculate probability component that calculates a probability that each word expresses an opinion.

9. A computing device that generates opinion data, the computing device comprising:
    a training data store containing training data that includes sentences and associated indications of opinions expressed by each sentence;
    an identify sequences component that identifies from the training data sequences of parts of speech that may express an opinion;
    a first calculate probability component that calculates from the training data a probability that each sequence contains a word that may express an opinion;
    a second calculate probability component that calculates from the training data a probability that each word expresses an opinion; and
    an opinion data store that specifies sequences of parts of speech that may express an opinion, a probability that each sequence contains a word that may express an opinion, and a probability that each word expresses an opinion.

10. The computing device of claim 9 wherein the identify sequences component uses a natural language processor to identify parts of speech and a generalized sequential patterns algorithm to identify sequences of parts of speech.

11. The computing device of claim 9 wherein the first calculate probability component calculates the probability as follows:

$$P(ow \mid sp) = \frac{C_{ow|sp}}{C_{sp}}$$

where P(ow|sp) represents the conditional probability of a sentence containing an opinion word ow given a sequence of parts of speech sp of the sentence, $C_{ow|sp}$ represents the count of sentences with the sequence of parts of speech sp that contains opinion word ow, and $C_{sp}$ is a count of sentences that match the sequence of parts of speech sp.

12. The computing device of claim 9 wherein the second calculate probability component calculates the probability as follows:

$$P(o \mid ow) = \frac{C_{o|ow}}{C_{ow}}$$

where P(o|ow) represents the conditional probability of a sentence expressing opinion o given that the sentence contains an opinion word ow, $C_{o|ow}$ represents the count of sentences that contain the opinion word ow that express the opinion o, and $C_{ow}$ is a count of sentences that contain the opinion word ow.

13. The computing device of claim 9
wherein the identify sequences component uses a natural language processor to identify parts of speech and a generalized sequential patterns algorithm to identify sequences of parts of speech;
wherein the first calculate probability component calculates the probability as follows:

$$P(ow \mid sp) = \frac{C_{ow|sp}}{C_{sp}}$$

where P(ow|sp) represents the conditional probability of a sentence containing an opinion word ow given a sequence of parts of speech sp of the sentence, $C_{ow|sp}$ represents the count of sentences matching the sequence of parts of speech sp that contain opinion word ow, and $C_{sp}$ is a count of sentences with the sequence of parts of speech sp; and
wherein the second calculate probability component calculates the probability as follows:

$$P(o \mid ow) = \frac{C_{o|ow}}{C_{ow}}$$

where P(o|ow) represents the conditional probability of a sentence expressing opinion o given that the sentence contains an opinion word ow, $C_{o|ow}$ represents the count of sentences that contain the opinion word ow that express the opinion o, and $C_{ow}$ is a count of sentences that contain the opinion word ow.

14. The computing device of claim 9 wherein the sentences of the training data are collected from reviews.

15. The computing device of claim 14 wherein the reviews are product reviews.

16. A computer-readable medium encoded with computer-executable instructions for controlling a computing device to determine an opinion expressed in a sentence, by a method comprising:
calculating a probability that the sentence contains a sequence of parts of speech that indicate an expression of the opinion;
determining a probability that the sentence contains an opinion word that expresses the opinion given the sequence;
determining a probability that a word of the sentence expresses the opinion given the opinion word; and
calculating an overall probability that the sentence expresses the opinion by combining the probabilities.

17. The computer-readable medium of claim 16 wherein the overall probability that the sentence expresses an opinion is calculated for a positive opinion and a negative opinion and including selecting as the opinion for the sentence the opinion associated with the higher of the overall probabilities.

18. The computer-readable medium of claim 16 wherein the overall probability is represented by the following:

$$P(o|s)=P(o|ow)*P(ow|sp)*P(sp|s)$$

where P(x|y) represents the conditional probability of x given y, s represents the target words, o represents the opinion, ow represents an opinion word that may express an opinion, and sp represents a sequence of parts of speech that may express an opinion.

19. The computer-readable medium of claim 16 including providing an opinion data store that specifies sequences of parts of speech that may express an opinion, a probability that each sequence contains a word that may express an opinion, and a probability that each word expresses an opinion.

20. The computer-readable medium of claim 19 wherein the opinion data store is generated by identifying from training data sequences of parts of speech that may express an opinion, calculating from the training data a probability that each sequence contains a word that may express an opinion, and calculating from the training data a probability that each word expresses an opinion.

* * * * *

UNITED STATES PATENT AND TRADEMARK OFFICE
CERTIFICATE OF CORRECTION

| | | |
|---|---|---|
| PATENT NO. | : 7,761,287 B2 | Page 1 of 1 |
| APPLICATION NO. | : 11/552057 | |
| DATED | : July 20, 2010 | |
| INVENTOR(S) | : Hua Li et al. | |

It is certified that error appears in the above-identified patent and that said Letters Patent is hereby corrected as shown below:

In column 4, line 28, delete "Patterns" and insert -- Patterns: --, therefor.

Signed and Sealed this
Eighth Day of February, 2011

David J. Kappos
*Director of the United States Patent and Trademark Office*